(12) United States Patent  (10) Patent No.: US 8,485,714 B2
Naoi et al.  (45) Date of Patent: Jul. 16, 2013

(54) SEALED MIXER

(75) Inventors: Masaki Naoi, Takasago (JP); Kenji Kubo, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/260,112

(22) PCT Filed: Mar. 15, 2010

(86) PCT No.: PCT/JP2010/001823
§ 371 (c)(1),
(2), (4) Date: Sep. 23, 2011

(87) PCT Pub. No.: WO2010/116617
PCT Pub. Date: Oct. 14, 2010

(65) Prior Publication Data
US 2012/0020181 A1 Jan. 26, 2012

(30) Foreign Application Priority Data

Mar. 30, 2009 (JP) ................................. 2009-082048

(51) Int. Cl.
*A21C 1/00* (2006.01)
(52) U.S. Cl.
USPC ........................................................ 366/76.7
(58) Field of Classification Search
USPC .............................. 366/18, 76.7, 162.5; 184/5
See application file for complete search history.

(56) References Cited

U.S. PATENT DOCUMENTS

| 1,516,488 A | * | 11/1924 | Banbury | ...................... 366/76.7 |
| 4,750,409 A | * | 6/1988 | Hendry | ........................... 92/158 |
| 5,061,078 A | | 10/1991 | Yada | |
| 5,715,911 A | * | 2/1998 | Kunka et al. | .................... 184/6.9 |
| 5,783,983 A | | 7/1998 | Ureshino et al. | |
| 6,422,733 B1 | | 7/2002 | Adams et al. | |
| 6,527,429 B1 | | 3/2003 | Tanaka et al. | |
| 8,047,701 B2 | | 11/2011 | Naoi | |

(Continued)

FOREIGN PATENT DOCUMENTS

| CN | 101153470 A | 4/2008 |
| JP | 3 16628 | 1/1991 |

(Continued)

OTHER PUBLICATIONS

International Search Report Issued Apr. 6, 2010 in PCT/JP10/001823 filed Mar. 15, 2010.

(Continued)

*Primary Examiner* — Tony G Soohoo
*Assistant Examiner* — Anshu Bhatia
(74) *Attorney, Agent, or Firm* — Oblon, Spivak, McClelland, Maier & Neustadt, L.L.P.

(57) ABSTRACT

A sealed mixer comprises a housing provided with a mixing chamber and a material insertion port for inserting materials into the mixing chamber; a weight for pressing the materials inserted into the material insertion port toward the mixing chamber; and a shaft member which extends upward from the weight and moves upward and downward together with the weight, the weight being connected to a lower end portion of the shaft member, a reservoir adapted to store lubricant between the weight and the shaft member is formed at a part connecting the weight and the shaft member, and a lubricant supply path adapted to supply the lubricant from an outside toward the reservoir is formed in the shaft member.

6 Claims, 8 Drawing Sheets

U.S. PATENT DOCUMENTS

| | | |
|---|---|---|
| 2004/0179424 A1 | 9/2004 | Yamada et al. |
| 2008/0078853 A1 | 4/2008 | Sugino et al. |
| 2011/0267919 A1 | 11/2011 | Naoi et al. |

FOREIGN PATENT DOCUMENTS

| | | |
|---|---|---|
| JP | 9 206581 | 8/1997 |
| JP | 10 211616 | 8/1998 |
| JP | 10 244143 | 9/1998 |
| JP | 2002 500115 | 1/2002 |
| JP | 2005 14520 | 1/2005 |
| TW | 371919 | 10/1999 |
| TW | 458867 | 10/2001 |

OTHER PUBLICATIONS

International Preliminary Report on Patentability with Written Opinion issued on Nov. 24, 2011 in PCT/JP2010/001823 filed on Mar. 15, 2010.

Combined Taiwanese Office Action and Search Report issued Jul. 24, 2012, in Taiwanese Patent Application No. 099108703 with English Summary.

* cited by examiner

SEALED MIXER

TECHNICAL FIELD

The present invention relates to a sealed mixer with a weight, for example, for pressing materials inserted into the mixer toward a mixing chamber.

BACKGROUND ART

Conventionally, a sealed mixer disclosed in patent document 1 has been, for example, known as the one with a weight for pressing materials inserted into the mixer toward a mixing chamber. Patent document 1 discloses the sealed mixer including a floating weight provided movably upward and downward and capable of pressing materials toward a mixing chamber of a mixer main body, and a shaft member connected to the floating weight and extending in an elevation direction of the floating weight. In such a sealed mixer, lubricant such as grease for easing friction and the like between the floating weight and the shaft member is generally filled in the floating weight.

In the sealed mixer as disclosed in patent document 1, to replace the lubricant in the floating weight and fill the lubricant into the floating weight, an operation of supplying the lubricant into the floating weight has to be performed by opening a hopper door used to supply materials after the floating weight is lifted up to the vicinity of the hopper door and stopped. That is, the lubricant supplying operation can be conventionally performed only after a lifting movement of the shaft member is stopped and it is confirmed that the weight has come to a complete stop. Further, the lubricant supplying operation in a hopper has been very cumbersome.

CITATION LIST

Patent Document

Patent Document 1: Japanese Unexamined Patent Publication No. H 10-211616

SUMMARY OF INVENTION

An object of the present invention is to provide a sealed mixer which has solved the above problem.

Another object of the present invention is to provide a sealed mixer capable of easily supplying lubricant to a weight.

A sealed mixer according to one aspect of the present invention comprises a housing provided with a mixing chamber and a material insertion port for inserting materials into the mixing chamber; a weight for pressing the materials inserted into the material insertion port toward the mixing chamber; and a shaft member which extends upward from the weight and moves upward and downward together with the weight, the weight being connected to a lower end portion of the shaft member, a reservoir adapted to store lubricant between the weight and the shaft member is formed at a part connecting the weight and the shaft member, and a lubricant supply path adapted to supply the lubricant from an outside toward the reservoir is formed in the shaft member.

EMBODIMENTS OF INVENTION

Figure 1:
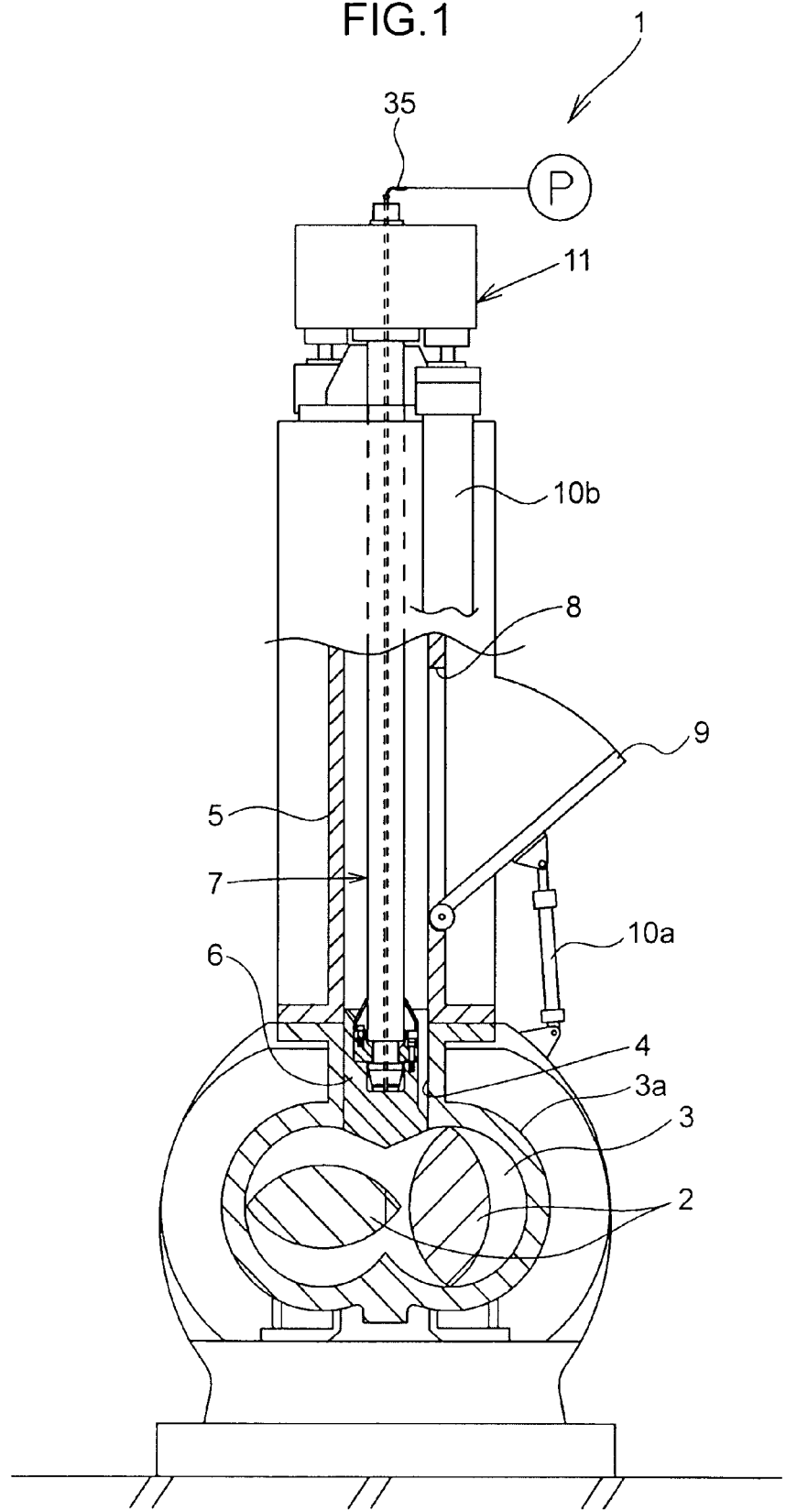
FIG. 1 is an overall view of a sealed mixer according to one embodiment of the invention.

Hereinafter, an embodiment of the present invention is described with reference to the drawings.

First, the overall construction of a sealed mixer 1 according to one embodiment of the present invention is described with reference to FIG. 1.

The sealed mixer 1 of this embodiment is a batch mixer for forcibly pressing materials such as rubber and plastic into a mixing chamber 3 and mixing these materials by mixing rotors 2 which rotate in the mixing chamber 3. This sealed mixer 1 includes a pair of mixing rotors 2, a housing 3a, a hopper 5, a weight 6, a shaft member 7, a hopper door 9 and a hydraulic cylinder 10a.

The mixing chamber 3 in which the pair of left and right mixing rotors 2 are rotatably arranged is provided in the housing 3a. The mixing chamber 3 is in the form of a hole having a spectacle-shaped cross-section along a plane perpendicular to axial directions of the mixing rotors 2. That is, the mixing chamber 3 is formed to have such a shape that a pair of left and right holes having a circular cross section are connected while partly overlapping in a lateral direction. Left and right substantially circular hole parts of the mixing chamber 3 house respectively the mixing rotor 2. The pair of mixing rotors 2 rotate in the same direction or in opposite directions. A material insertion port 4 communicating with the mixing chamber 3 is provided at an upper position of the mixing chamber 3 of the housing 3a. This material insertion port 4 is used to insert the materials into the mixing chamber 3.

The hopper 5 is in the form of a long rectangular tube and extends in a vertical direction. The hopper 5 is so connected to an upper part of the housing 3a that the interior space of the hopper 5 communicates with the material insertion port 4. One side wall (right side wall in FIG. 1) of the hopper 5 is provided with a material supply port 8 used to supply the materials into the hopper 5. The hopper door 9 which is opened and closed by extension and contraction of the hydraulic cylinder 10a and the like is mounted at a part of the hopper 5 corresponding to the material supply port 8. The material supply port 8 is freely opened and closed by this hopper door 9.

The weight 6 is a so-called floating weight and used to press the materials inserted into the material insertion port 4 toward the mixing chamber 3. The weight 6 is vertically movably provided in the hopper 5.

The shaft member 7 enables the weight 6 to move upward and downward. This shaft member 7 extends in the vertical direction which is an elevation direction of the weight 6. The weight 6 is attached to a leading end portion (lower end portion) of the shaft member 7. An upper end side of the shaft member 7 is connected to an elevating device 11.

The elevating device 11 includes a hydraulic cylinder 10b. The elevating device 11 moves the shaft member 7 upward and downward by utilizing extension and contraction of the hydraulic cylinder 10b. The weight 6 attached to the shaft member 7 is movable upward and downward by upward and downward movements of the shaft member 7 by this elevating device 11.

Next, the weight 6 and the shaft member 7 are described in detail with reference to FIGS. 2 and 3.

The weight 6 is formed to have a rectangular shape long along axial center directions of the mixing rotors 2. Further, a lower part of the weight 6 has a tapered conical shape. This lower conical part of the weight 6 is so shaped as to substantially conform to the shape of the inner surface of the housing 3a forming the mixing chamber 3 when the weight 6 moves down to the lowest position. As shown in FIG. 3, an inclined surface is formed on the upper surface of the weight 6. This inclined surface is inclined downward from the left side opposite to the material supply port 8 to the right side where the material supply port 8 is provided. A longitudinal central part of the weight 6 is provided with a vertically recessed recess 12 as shown in FIG. 3. The leading end portion (lower end portion) of the shaft member 7 is inserted into this recess 12 and the weight 6 and the shaft member 7 are connected in this state.

Since the inclined surface inclined downward toward the material supply port 8 is formed on the upper surface of the weight 6 as described above, a cleaning operation and the like near a part connecting the weight 6 and the shaft member 7 are easily performed through the material supply port 8 opened by opening the hopper door 9 if the weight 6 is arranged near the material supply port 8.

The recess 12 of the weight 6 and the leading end portion of the shaft member 7 are not so fitted as to be held in close contact with each other, and a clearance is formed between the inner surface of the recess 12 and the outer surface of the leading end portion of the shaft member 7. Thus, even if the weight 6 receives a material mixing force by the mixing rotors 2 when being lowered to the lowest position, a bending stress resulting from this mixing force does not act on the shaft member 7. The clearance between the inner surface of the recess 12 of the weight 6 and the outer surface of the leading end portion of the shaft member 7 serves as a reservoir 14 for storing lubricant. By storing the lubricant such as grease in the reservoir 14, friction and the like acting between the inner surface of the recess 12 of the weight 6 and the outer surface of the leading end portion of the shaft member 7 are reduced even if these surfaces come into contact.

The shaft member 7 includes a main shaft portion 16, a constricted portion 17 and a distant end portion 18. The main shaft portion 16 is a part arranged in the hopper 5 and in the form of a round bar extending in a longitudinal direction of the hopper 5. The constricted portion 17 is provided continuously with the leading end (lower end) of the main shaft portion 16. That is, the constricted portion 17 extends downward from the lower end of the main shaft portion 16. The distant end portion 18 is provided continuously with the leading end (lower end) of the constricted portion 17. That is, the distant end portion 18 extends downward from the lower end of the constricted portion 17. An outer diameter of the constricted portion 17 is smaller than that of the main shaft portion 16 and the distant end portion 18 has a large-diameter part having an outer diameter larger than an outer diameter of the constricted portion 17. The distant end portion 18 also includes a part provided below the large-diameter part and having a tapered outer surface. A ring-shaped retaining member 19 for preventing the detachment of the leading end portion of the shaft member 7 from the recess 12 of the weight 6 is provided around the constricted portion 17. That is, the constricted portion 17 is inserted into the ring-shaped retaining member 19. In this way, even if a force acts to pull the shaft member 7 from the recess 12 of the weight 6, the distant end portion 18 comes into contact with the retaining member 19 to prevent the leading end portion of the shaft member 7 from being detached from the recess 12 of the weight 6.

Specifically, an outermost diameter of the distant end portion 18 is slightly smaller than an inner diameter of the recess 12 of the weight 6. After this distant end portion 18 is inserted into the recess 12, the retaining member 19 is arranged around the constricted portion 17 and, then, the retaining member 19 is mounted on a flat surface 21 formed around the opening of the recess 12 of the weight 6 by a fastening device 20 such as a bolt. A clearance is formed between the outer surface of the constricted portion 17 of the shaft member 7 and the inner surface of the retaining member 19. This clearance also serves as a part of the reservoir 14. Note that the retaining member 19 is dividable so as to be able to surround the outer periphery of the constricted portion 17.

A ring-shaped seal member 26 is so provided on the outer periphery of the main shaft portion 16 located above the constricted portion 17 as to surround the main shaft portion 16. This seal member 26 is supported by a seal supporting member 25 arranged around the seal member 26. The seal supporting member 25 is fastened to the retaining member 19 by a fastening device 27 such as a bolt. A dust cover 28 for covering the outer periphery of the main shaft portion 16 is provided above the seal supporting member 25. This dust cover 28 has an inverted cup shape with a hole formed in a ceiling part thereof, through which hole the main shaft portion 16 is inserted.

Figure 3:
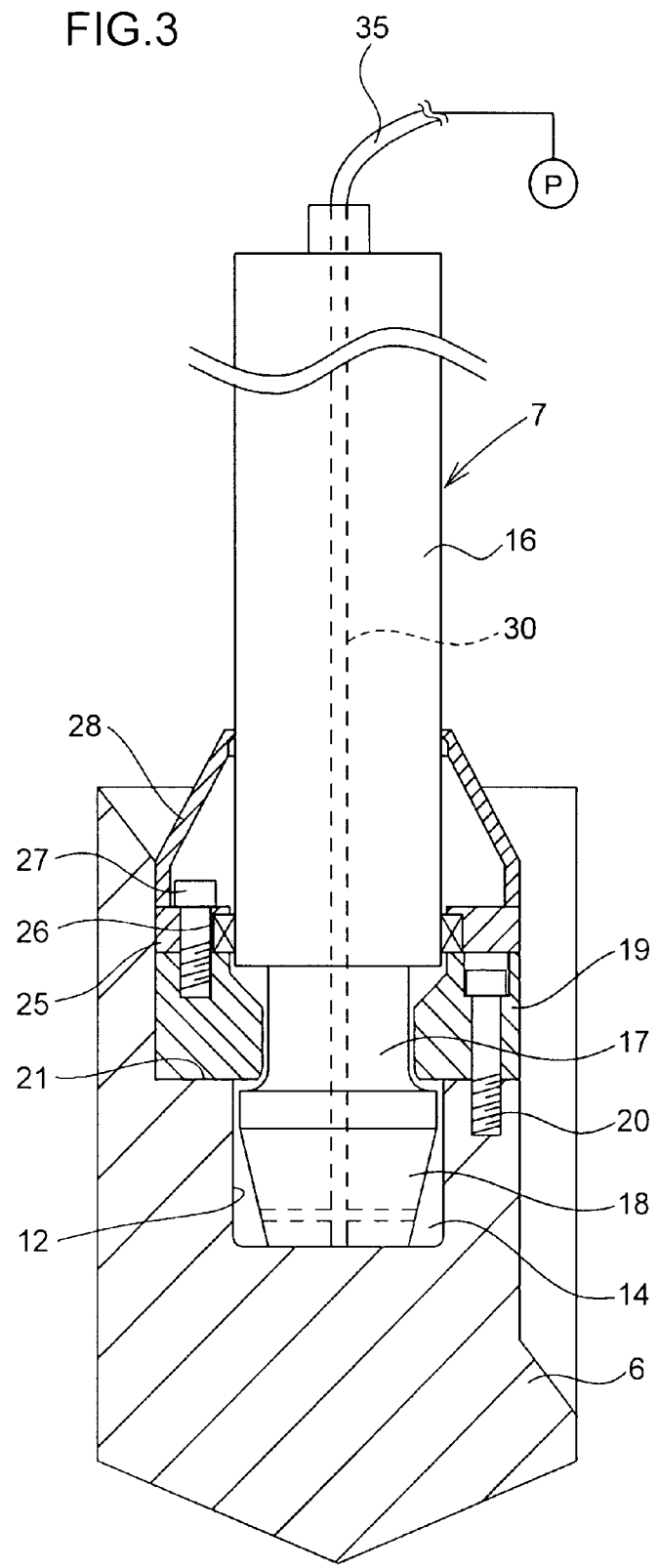
FIG. 3 is a front view in section of the weight.

As shown in FIG. 3, a lubricant supply path 30 used to supply the lubricant to the reservoir 14 from the outside is formed in the shaft member 7. Specifically, this lubricant supply path 30 penetrates through the main shaft portion 16 by extending in an axial center direction from the base end (upper end) to the leading end (lower end) of the main shaft portion 16 of the shaft member 7 and also penetrates in the axial center direction through the constricted portion 17 and the distant end portion 18 following the main shaft portion 16. Further, the lubricant supply path 30 is branched off into a plurality of paths in the distant end portion 18, and the respective branch paths extend in different radial directions of the distant end portion 18 and make openings in the taper surface of the distant end portion 18. In this way, the lubricant supply path 30 communicates with the reservoir 14.

Further, the lubricant supply path 30 extends up to the upper end of the elevating device 11 through the interior of the elevating device 11. A supplying member 35 used to supply the lubricant into the lubricant supply path 30 from the outside is connectable to the upper end of this elevating device 11. The supplying member 35 is, for example, a hose, a pipe or the like. The supplying member 35 is connected to a pump P for feeding the lubricant. By driving the pump P, the lubricant is automatically supplied to the lubricant supply path 30 through a flow path in the supplying member 35. Note that, in the sealed mixer 1 shown in FIG. 1, the height of the lubricant supply path 30 changes and the vertical position of the supplying member 35 changes as the shaft member 7 is moved upward and downward by the elevating device 11.

Figure 2:
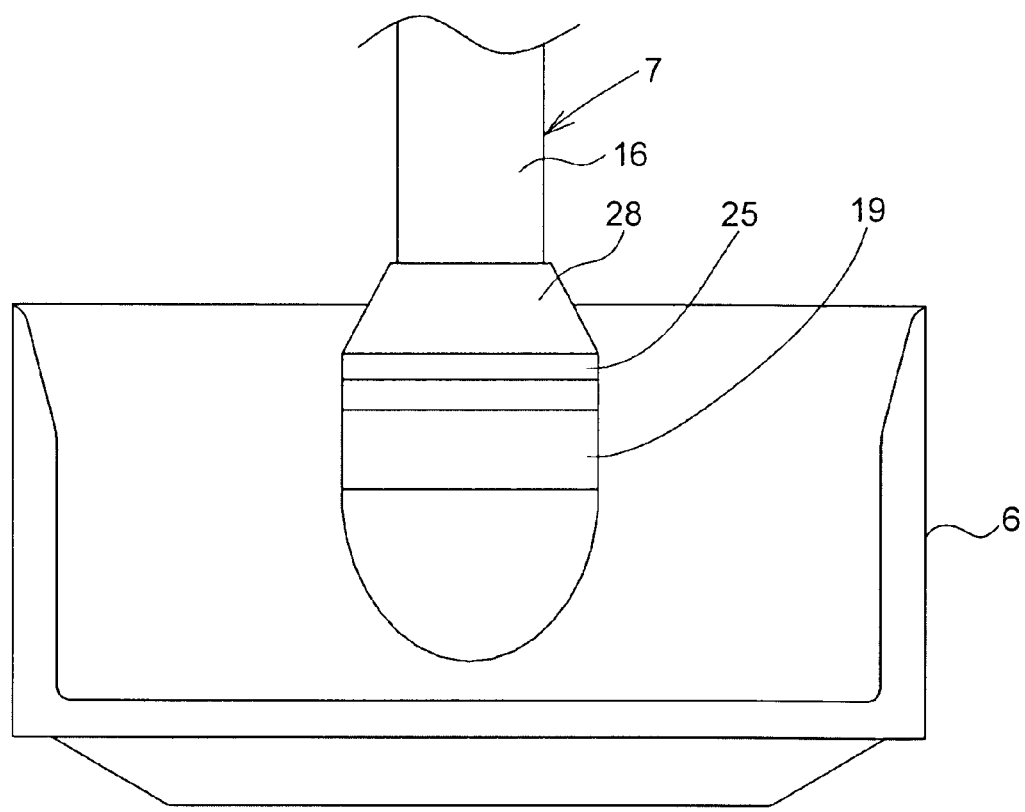
FIG. 2 is a right side view of a weight.

In the embodiment shown in FIGS. 1 to 3, the reservoir 14 for storing the lubricant between the weight 6 and the shaft member 7 is formed in the part connecting the weight 6 and the shaft member 7, and the lubricant supply path 30 for supplying the lubricant from the outside to the reservoir 14 is formed in the shaft member 7. Thus, the lubricant can be easily supplied from the outside to the reservoir 14 through the lubricant supply path 30 provided in the shaft member 7 without stopping the movement of the weight 6. Conventionally, to replace the lubricant in the weight 6 and fill the lubricant into the weight 6, an operation of supplying the lubricant into the weight 6 has to be performed by opening the hopper door 9 after the weight 6 is moved upward to the vicinity of the hopper door 9 used to supply the materials and stopped. In this way, the lubricant supplying operation has to be conventionally performed in the hopper 5 after the upward movement of the shaft member 7 is stopped and it is confirmed that the weight 6 has come to a complete stop. This has been very cumbersome. On the contrary, according to this embodiment, the lubricant can be supplied without performing such a cumbersome supplying operation.

Particularly, since the mixer has to be conventionally stopped for a long time for the lubricant supplying operation, there is a problem of reducing productivity. On the other hand, the lubricant supplying operation has to be reduced as much as possible if it is tried to maintain productivity in this conventional construction. Then, there is a possibility of increasing failure rates of the weight 6 and the shaft member 7. Since the sealed mixer 1 needs not be stopped for a long time for the lubricant supplying operation in this embodiment, productivity is not reduced due to the lubricant supplying operation. Therefore, in this embodiment, it is not necessary to reduce the lubricant supplying operation as much as possible and, as a result, to worry about increases in failure rates of the weight 6 and the shaft member 7.

Figure 4:
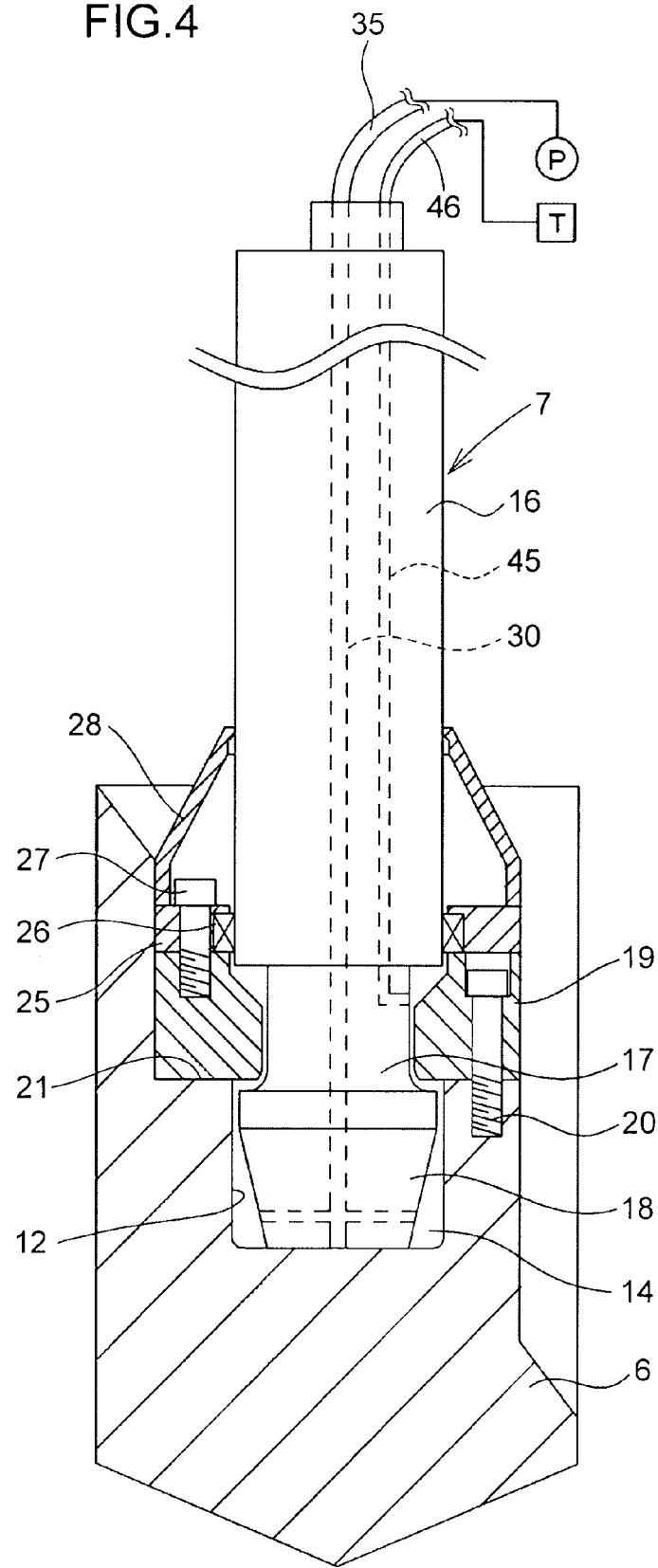
FIG. 4 is a front view in section of a weight in a modification in which a shaft member is provided with a lubricant discharge path.

FIG. 4 shows a modification in which a lubricant discharge path 45 for discharging lubricant in a reservoir 14 to the outside is provided in a shaft member 7. As shown in FIG. 4, the lubricant discharge path 45 penetrates through the shaft member 7 at a position different from a lubricant supply path 30 and communicates with the reservoir 14 near a retaining member 19. Specifically, the lubricant discharge path 45 extends in an axial center direction of the shaft member 7 from the base end (upper end) to the leading end (lower end) of a main shaft portion 16 of the shaft member 7 and extends radially outward in a constricted portion 17. Further, the lubricant discharge path 45 is bent at a right angle in the constricted portion 17 and makes an opening in the side surface of the constricted portion 17. This allows the lubricant discharge path 45 to communicate with the reservoir 14 above a position where the lubricant supply path 30 communicates with the reservoir 14. That is, the entrance of the lubricant discharge path 45 is located above the exit of the lubricant supply path 30 in the weight 6 and they are separated from each other.

Further, the lubricant discharge path 45 extends up to the upper end of an elevating device 11 through the interior of the elevating device 11. A discharging member 46 for discharging the lubricant discharged from the reservoir 14 through the lubricant discharge path 45 to the outside is connectable to the upper end of this elevating device 11. The discharging member 46 is, for example, a hose, a pipe or the like. The discharging member 46 is connected to a container T for storing the used lubricant discharged from the reservoir 14. Thus, the used lubricant in the reservoir 14 can be discharged into the container T through the discharging member 46. Note that the height of the lubricant discharge path 45 changes and the vertical position of the discharging member 46 changes as the shaft member 7 is moved upward and downward by the elevating device 11.

In the modification of FIG. 4, the lubricant discharge path 45 communicating with the reservoir 14 and adapted to discharge the lubricant in the reservoir 14 to the outside is provided in the shaft member 7 and extends in the axial center direction of the shaft member 7 to reach a base end portion (upper end portion) of the shaft member 7. Thus, the lubricant in the reservoir 14 can be easily replaced.

For example, in the case of supplying lubricant into the reservoir 14, lubricant already filled in the reservoir 14 (used lubricant) flows into the lubricant discharge path 45. That is, the lubricant discharge path 45 serves as a drain hole for the lubricant from the reservoir 14. Thus, new lubricant can be evenly filled into the reservoir 14. Further, the lubricant can be intermittently supplied to the reservoir 14 by the pump P every time the lubricant is replaced. Further, if a control is executed to automatically operate the pump P when the lubricant is replaced, the lubricant can be automatically flowed from the lubricant supply path 30 to the lubricant discharge path 45 via the reservoir 14.

Figure 5:
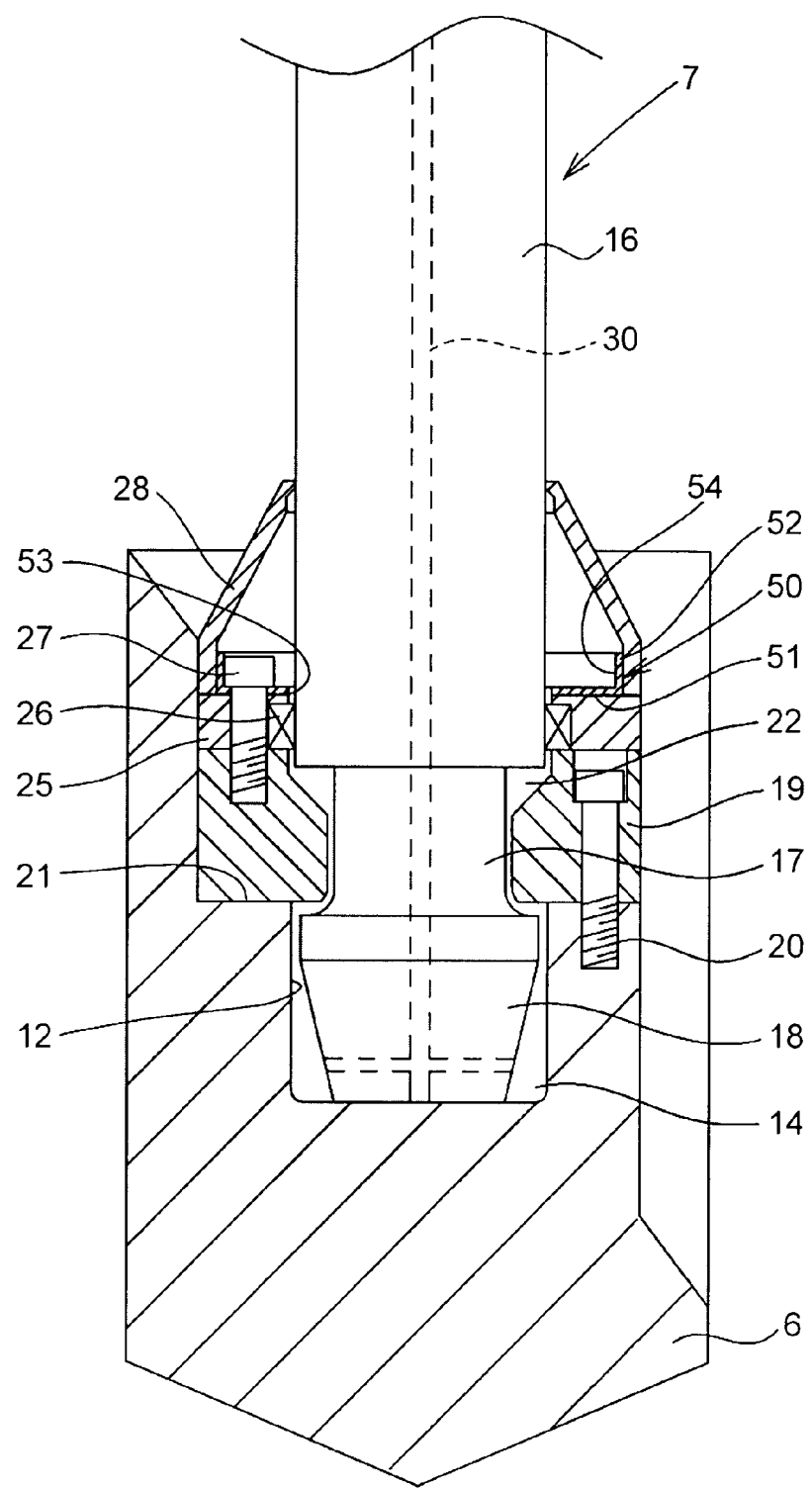
FIG. 5 is a front view in section of a weight in a modification including a pan.

FIG. 5 shows a modification in which a pan 50 is provided instead of the lubricant discharge path 45. Specifically, a sealed mixer according to the modification shown in FIG. 5 includes a seal supporting member 25, a seal member 26 and the pan 50. The seal supporting member 25 is provided above a retaining member 19, and the seal member 26 is provided inside the seal supporting member 25. The seal member 26 is for cutting off communication between a reservoir 14 and an outside of a weight 6. The pan 50 is for storing leaked lubricant and provided outside the seal member 26. Specifically, the pan 50 stores the lubricant driven upward by the supply of new lubricant into the reservoir 14 and leaked out from between the seal member 26 and a main shaft portion 16. More specifically, the pan 50 is placed on the upper surface of the seal supporting member 25 in a tubular dust cover 28 provided above the seal supporting member 25. This pan 50 includes a plate-like base portion 51 fixed to the retaining member 19 by a fastening device 27 such as a bolt and a peripheral wall portion 52 standing up from the peripheral edge of the base portion 51. An insertion hole, through which the main shaft portion 16 of a shaft member 7 is inserted, is provided in a central part of the base portion 51. The peripheral wall portion 52 is shaped in conformity with a side wall of a lower part of the dust cover 28.

Since the pan 50, i.e. a lubricant receiving part 54 is provided in the modification of FIG. 5 as described above, the lubricant can be received by the lubricant receiving part 54 composed of the base portion 51 and the peripheral wall portion 52 if the lubricant remaining in an upper part of the reservoir 14 leaks out from between the seal member 26 and the main shaft portion 16 and passes through the insertion hole 53 of the pan 50, for example, when lubricant such as grease is supplied into the reservoir 14 through the lubricant supply path 30. Since the lubricant coming out upward from the seal member 26 (lower side) can be received by the lubricant receiving part 54 in this way, the lubricant can be filled into the reservoir 14 utilizing the pan 50 even if a discharge port and a lubricant discharge path 45 for discharging the lubricant in the reservoir 14 to the outside are not provided.

Figure 6:
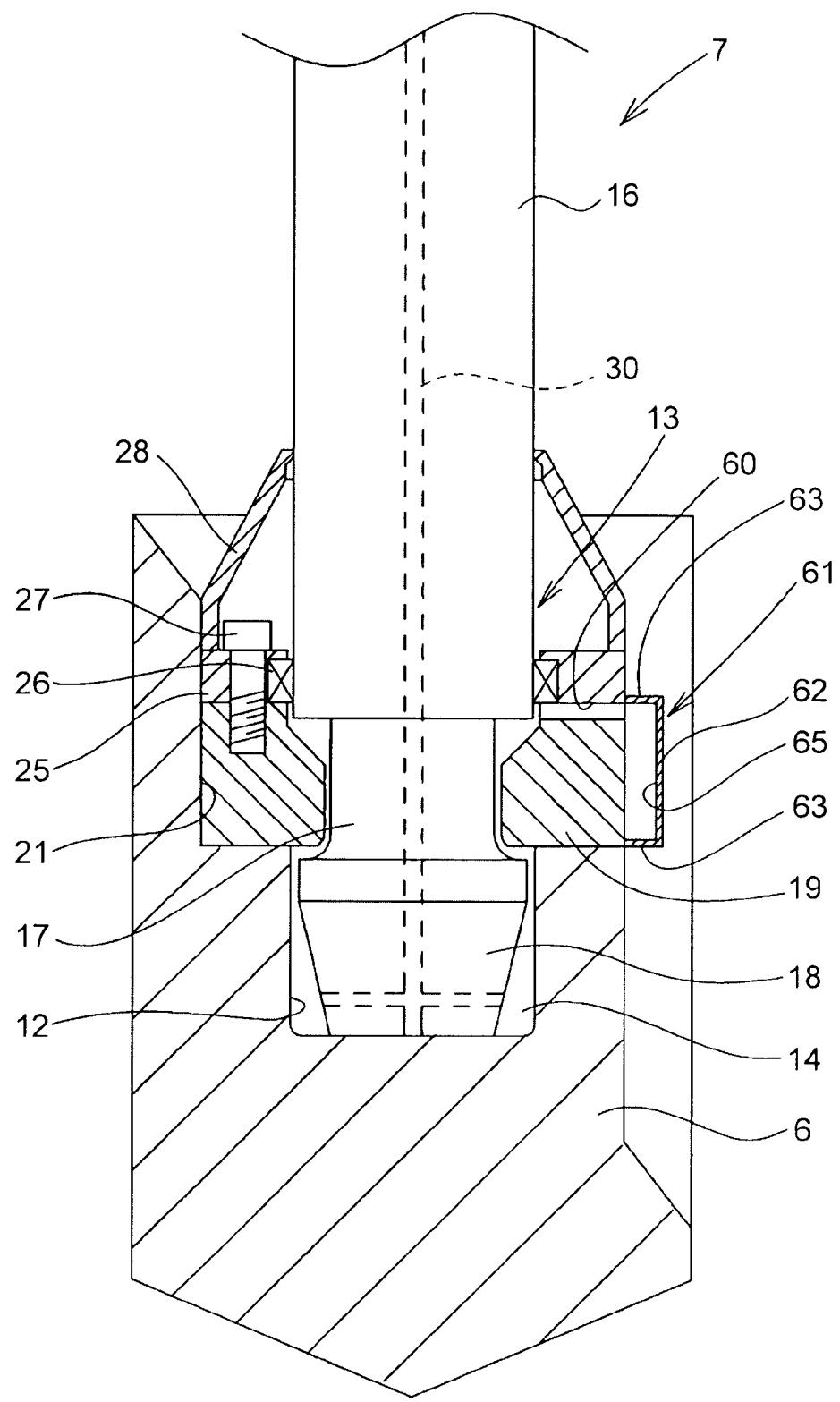
FIG. 6 is a front view in section of a weight in another modification including a pan.
Figure 7:
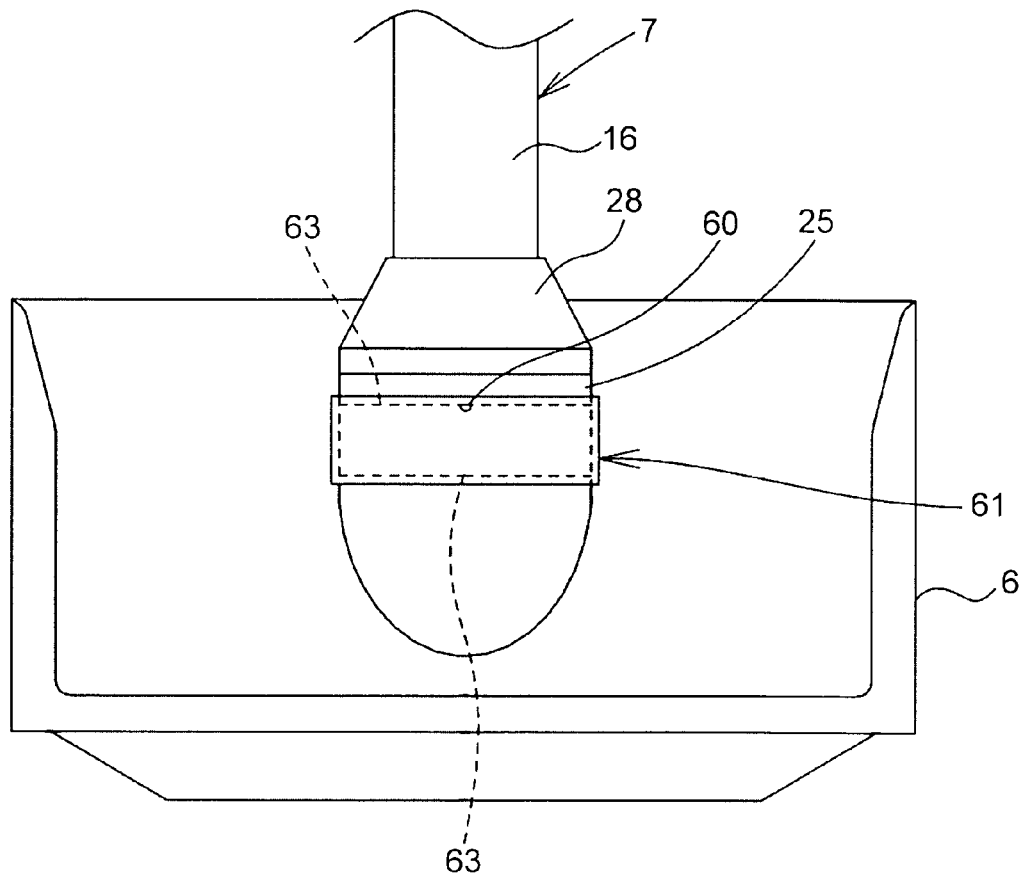
FIG. 7 is a left side view of the weight in the other modification including the pan.

FIGS. 6 and 7 show a modification including a lubricant receiving part which is constructed differently from the lubricant receiving part 54 shown in FIG. 5. In the modification shown in FIGS. 6 and 7, a lubricant discharge hole 60 is formed to penetrate through a retaining member 19 in a radial direction. This lubricant discharge hole 60 communicates with an upper part of a reservoir 14 and lubricant in the reservoir 14 is discharged to the outside via this lubricant discharge hole 60. In this modification, the lubricant discharge hole 60 is formed by covering a groove formed in the upper surface of the retaining member 19 by a seal supporting member 25, but a lubricant discharge hole may be formed by forming a drill hole in the retaining member 19.

Further, a box 61 with one open side is so mounted at an outer side of the retaining member 19 as to cover the lubricant discharge hole 60.

Specifically, the box 61 includes a plate-like base portion 62 and a peripheral wall portion 63 projecting toward one side from the peripheral edge of this base portion 62 and is formed to have a box shape with one open side. The peripheral wall portion 63 is provided with a locking portion engaged with the outer periphery of the retaining member 19. In the modification shown in FIGS. 6 and 7, the base portion 62 of the box 61 is arranged to face the outer peripheral surface of the retaining member 19, and the locking portion provided on the peripheral wall portion 63 of the box 61 is engaged with a groove or the like provided in the outer peripheral surface of the retaining member 19. In this way, an area of the outer peripheral surface of the retaining member 19 including a part where the lubricant discharge hole 60 is formed is covered by the box 61. As a result, the lubricant discharged from the lubricant discharge hole 60 can be received by a lubricant receiving part 65 composed of the base portion 62, the peripheral wall portion 63 and the outer peripheral surface of the retaining member 19.

Since the lubricant discharged from the lubricant discharge hole 60 can be received by the lubricant receiving part 65 in this way, the lubricant can be filled into the reservoir 14 even if a lubricant discharge path 45 for discharging the lubricant in the reservoir 14 to the outside is not provided in a shaft member 7.

Figure 8:
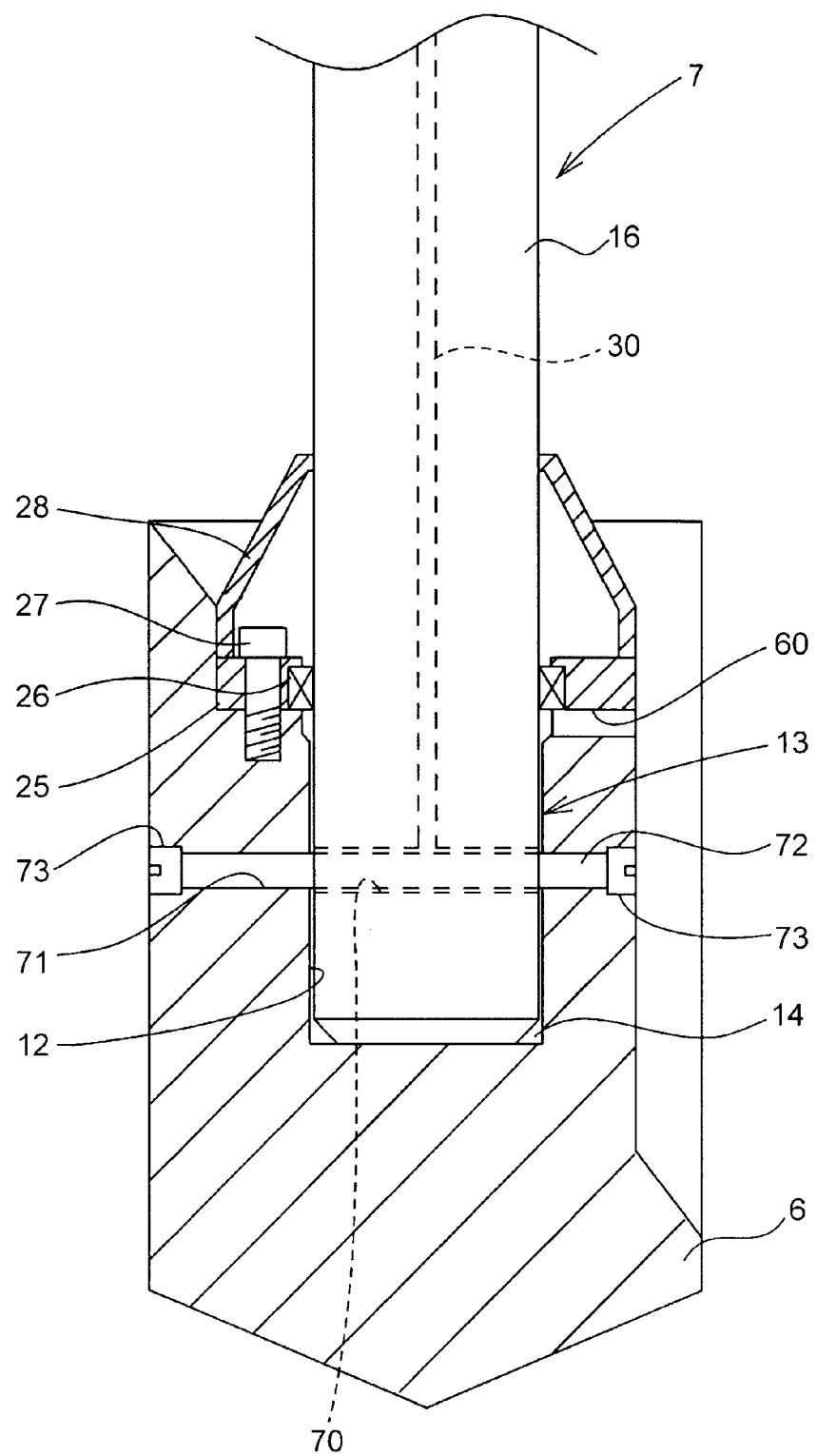
FIG. 8 is a front view in section of a weight in a modification showing a part connecting the weight and a shaft member.

FIG. 8 shows a modification of the part connecting the weight 6 and the shaft member 7. Although the constricted portion 17 is formed at the leading end portion of the shaft member 7 in the above embodiment, a shaft member 7 is not provided with the constricted portion 17 in this modification.

Specifically, in this modification, a leading end portion of the shaft member 7 having an outer diameter slightly smaller than an inner diameter of a recess 12 is inserted in the recess 12 and a clearance is formed between the outer surface of this leading end portion and the inner surface of the recess 12. This clearance serves as a reservoir 14 for storing lubricant. A pin hole 70 which is a through hole penetrating in a radial direction is formed in the leading end portion of the shaft member 7. A through hole 71 penetrating from the recess 12 to the outer surface of a weight 6 is formed at a position of the weight 6 corresponding to the pin hole 70. A sealed mixer according to this modification includes a pin 72 penetrating through the weight 6 and the shaft member 7 to connect them. This pin 72 is inserted into the pin hole 70 of the shaft member 7 and the through hole 71 of the weight 6 and functions as a retaining member for preventing the shaft member 7 from coming out of the recess 12 of the weight 6. The pin 72 is retained at the opposite ends thereof by screwed plugs 73 provided at the opposite exits of the through hole 71 of the weight 6 while connecting the shaft member 7 and the weight 6. The shaft member 7 is movable with respect to the pin 72.

Further, the shaft member 7 is provided with a lubricant supply path 30. Specifically, this lubricant supply path 30 extends in an axial center direction from the base end toward the leading end of a main shaft portion 16 of the shaft member 7 and communicates with the pin hole 70. An inner diameter of the pin hole 70 is one size larger than an outer diameter of the pin 72. This causes the pin hole 70 to serve as a part of the lubricant supply path 30. That is, the pin hole 70 doubles as the part of the lubricant supply path 30.

In the modification shown in FIG. 8, a lubricant discharge path is not formed in the shaft member 7. A lubricant discharge hole 60 which allows the reservoir 14 and an outside of the weight 6 to communicate is provided at a position of the weight 6 above the recess 12. This lubricant discharge hole 60 is for discharging the lubricant in the reservoir 14 to the outside. In this modification, the lubricant discharge hole 60 is formed by covering a groove formed in an upper part of the weight 6 by a seal supporting member 25, but a lubricant discharge hole may be formed by forming a drill hole in the weight 6.

In the modification shown in FIG. 8, the pin 72 penetrating through the weight 6 and the shaft member 7 connects the weight 6 and the shaft member 7, and the pin hole 70 formed in the shaft member 7 doubles as the part of the lubricant supply path 30. Further, in this modification, the lubricant discharge hole 60 can be easily formed by forming the groove in the weight 6. Therefore, in this modification, the number of processing steps and the number of parts can be reduced.

Note that the embodiment disclosed this time is to be considered in all respects only as illustrative and not restrictive. The scope of the present invention is indicated by the appended claims rather than by the foregoing description and intended to embrace all changes which come within the meaning and range of equivalency of the claims.

SUMMARY OF EMBODIMENT

The above embodiment and modifications are summarized as follows.

Specifically, a sealed mixer according to the above embodiment and modifications includes a housing provided with a mixing chamber and a material insertion port for inserting materials into the mixing chamber; a weight for pressing the materials inserted into the material insertion port toward the mixing chamber; and a shaft member which extends upward from the weight and moves upward and downward together with the weight, the weight being connected to a lower end portion of the shaft member, a reservoir adapted to store lubricant between the weight and the shaft member is formed at a part connecting the weight and the shaft member, and a lubricant supply path adapted to supply the lubricant from an outside toward the reservoir is formed in the shaft member.

Preferably, the lubricant supply path extends in an axial center direction of the shaft member and reaches an upper end portion of the shaft member.

Preferably, a lubricant discharge path communicating with the reservoir and adapted to discharge the lubricant in the reservoir to the outside is provided in the shaft member.

Further preferably, the lubricant discharge path extends in the axial center direction of the shaft member and reaches the upper end portion of the shaft member.

Preferably, the weight is provided with a recess, the weight and the shaft member are interconnected while a lower end portion of the shaft member being inserted in the recess, and a clearance which constitutes at least a part of the reservoir is provided between the inner surface of the recess and the outer surface of the shaft member.

Preferably, the sealed mixer includes a pin penetrating through the weight and the shaft member to interconnect the weight and the shaft member, the shaft member is provided with a pin hole into which the pin is inserted, and the pin hole doubles as a part of the lubricant supply path.

Preferably, the sealed mixer includes a seal member for cutting off communication between the reservoir and an outside of the weight, and a pan provided on an outside of the seal member and adapted to store the leaked lubricant.

According to the embodiment and modifications, the lubricant can be easily supplied to the weight.

The invention claimed is:

1. A sealed mixer, comprising:
a housing provided with a mixing chamber and a material insertion port for inserting materials into the mixing chamber;
a weight for pressing the materials inserted into the material insertion port toward the mixing chamber;
a shaft member which extends upward from the weight and moves upward and downward together with the weight, the weight being connected to a lower end portion of the shaft member; and
a pair of mixing rotors which rotate in the mixing chamber to mix the materials; wherein
a reservoir adapted to store lubricant between the weight and the shaft member is formed at a part connecting the weight and the shaft member,
a lubricant supply path adapted to supply the lubricant from an outside toward the reservoir is formed in the shaft member,
the weight has a recess with an opened upper end and a closed lower end, and
the weight and the shaft member are interconnected while a lower end portion of the shaft member is inserted into the recess through the opened upper end and located in the recess with a clearance between the inner surface of the recess and the outer surface of the lower end portion of the shaft member, the clearance constituting at least a part of the reservoir.

2. A sealed mixer according to claim 1, wherein:
the lubricant supply path extends in an axial center direction of the shaft member and reaches an upper end portion of the shaft member.

3. A sealed mixer according to claim 1, wherein:
a lubricant discharge path communicating with the reservoir and adapted to discharge the lubricant in the reservoir to the outside is provided in the shaft member.

4. A sealed mixer according to claim 3, wherein:
the lubricant discharge path extends in the axial center direction of the shaft member and reaches the upper end portion of the shaft member.

5. A sealed mixer according to claim 1, further comprising a pin penetrating through the weight and the shaft member to interconnect the weight and the shaft member, wherein
the shaft member is provided with a pin hole into which the pin is inserted, and the pin hole doubles as a part of the lubricant supply path.

6. A sealed mixer according to claim 1, further comprising:
a seal member for cutting off communication between the reservoir and an outside of the weight, and
a pan provided on an outside of the seal member and adapted to store the leaked lubricant.

* * * * *